United States Patent
Xiao (10) Patent No.: US 8,593,567 B2
(45) Date of Patent: Nov. 26, 2013

(54) WEB CAMERA WITH POSITION ADJUSTMENT FUNCTION

(75) Inventor: Shi-Ying Xiao, New Taipei (TW)

(73) Assignee: KYE Systems Corp., New Taipei (TW)

( * ) Notice: Subject to any disclaimer, the term of this patent is extended or adjusted under 35 U.S.C. 154(b) by 177 days.

(21) Appl. No.: 13/137,457

(22) Filed: Aug. 17, 2011

(65) Prior Publication Data
US 2012/0120236 A1    May 17, 2012

(30) Foreign Application Priority Data
Nov. 16, 2010  (TW) ................................ 99139275 A (51) Int. Cl.
*H04N 5/225* (2006.01)
(52) U.S. Cl.
USPC .......................................................... 348/373
(58) Field of Classification Search
USPC .................................................. 348/373–376
See application file for complete search history.

(56) References Cited

U.S. PATENT DOCUMENTS

| | | | | |
|---|---|---|---|---|
| 6,411,332 B1* | 6/2002 | Whitby et al. | ................ | 348/373 |
| 6,848,842 B2* | 2/2005 | Saruhashi | ................ | 348/373 |
| 6,970,202 B1* | 11/2005 | Glogan et al. | ................ | 348/373 |
| 2006/0170817 A1* | 8/2006 | Wu | ................ | 348/373 |
| 2007/0001071 A1* | 1/2007 | Yeh | ................ | 248/179.1 |
| 2010/0084529 A1* | 4/2010 | Depay et al. | ................ | 248/229.22 |

* cited by examiner

*Primary Examiner* — Gevell Selby
(74) *Attorney, Agent, or Firm* — Bacon & Thomas, PLLC (57) ABSTRACT

A web camera with position adjustment function has a clamping apparatus, an extending arm and a camera module. The clamping apparatus includes a base and a supporting bracket. The supporting bracket is connected pivotally to a rear edge of the base and has a chamber and an open front. The extending arm is disposed inside the chamber of the supporting bracket of the clamping apparatus and is pivotally and slidably connected to the supporting bracket of the clamping apparatus. The camera module is connected pivotally to a front end of the extending arm. The extending arm can be operated to protrude out of the open front of the supporting bracket and then to rotate relative to the clamping apparatus. Therefore, a horizontal position of the camera module is changeable and various camera angles can be achieved.

8 Claims, 9 Drawing Sheets

WEB CAMERA WITH POSITION ADJUSTMENT FUNCTION

BACKGROUND OF THE INVENTION

1. Field of the Invention

The present invention relates to a web camera, and more particularly to a web camera with position adjustment function.

2. Description of the Prior Arts

Web cameras are video cameras that transmit images in real time to computers or computer network so that users can hold videoconferences or have video chats.

A conventional web camera comprises a clamping apparatus connected pivotally to a camera module. The clamping apparatus is used to clamp an upper edge of a computer screen or is directly placed on a desk. The camera module can be selectively adjusted to a suitable angle relative to the clamping apparatus to allow a camera lens of the camera module to aim at a user's face for well-angled shooting.

However, when the conventional web camera clamps the upper edge of the computer screen, the camera module is located higher than the user's face. Under this circumstance, images shot by the web camera can only show the user's face in top views. When the conventional web camera is placed on the desk, the camera module is located lower than the user's face. Under this circumstance, images shot by the web camera can only show the user's face in bottom views. That is, a horizontal position of the camera module of the conventional web camera is unchangeable so the camera module cannot be adjusted to locate at the user's eye level and images shot by the conventional web camera cannot show the user's face in eye level views.

To overcome the shortcomings, the present invention provides a web camera with position adjustment function to mitigate or obviate the aforementioned problems.

SUMMARY OF THE INVENTION

The main object of the present invention is to provide a web camera with position adjustment function having a rotatable extending arm to permit various camera angles.

To achieve the foregoing objective, the web camera in accordance with the present invention comprises a clamping apparatus, a sliding assembly and a camera module. The clamping apparatus includes a base and a supporting bracket. The supporting bracket is connected pivotally to a rear edge of the base and has a chamber and an open front. The sliding assembly is disposed inside the chamber of the supporting bracket of the clamping apparatus and includes an extending arm. The extending arm is pivotally and slidably connected to the supporting bracket of the clamping apparatus. The camera module is connected pivotally to a front end of the extending arm. The extending arm can be operated to protrude out of the open front of the supporting bracket and then to rotate relative to the clamping apparatus. Therefore, a horizontal position of the camera module is changeable and various camera angles can be achieved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
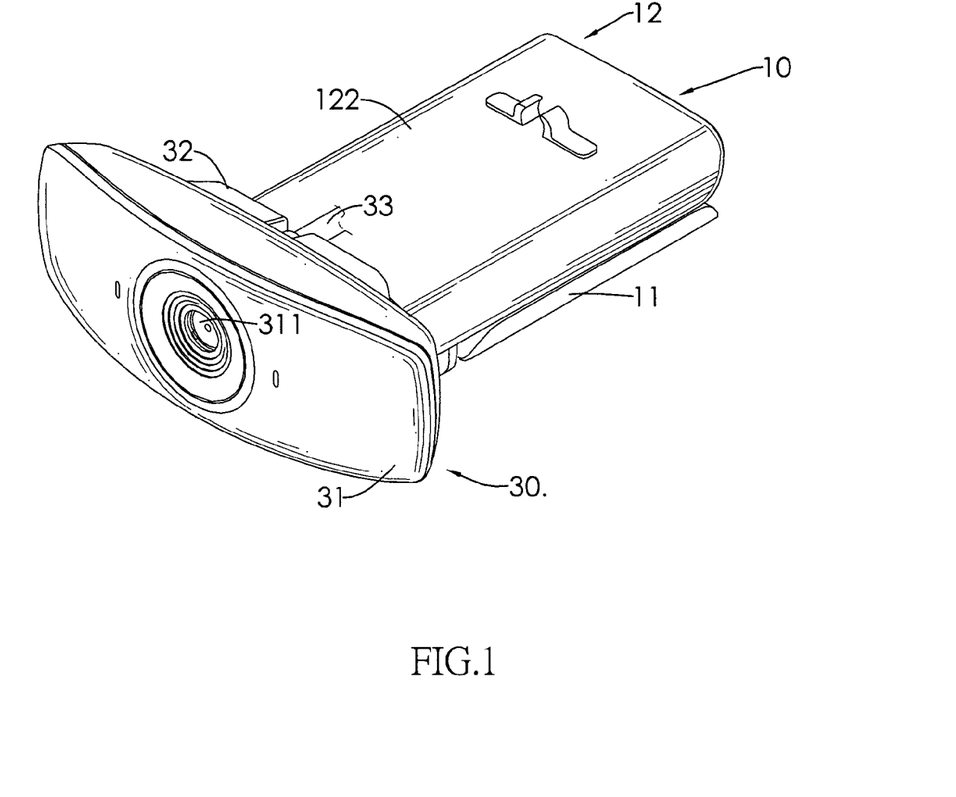
FIG. 1 is a perspective view of a web camera in accordance with the present invention.
Figure 2:
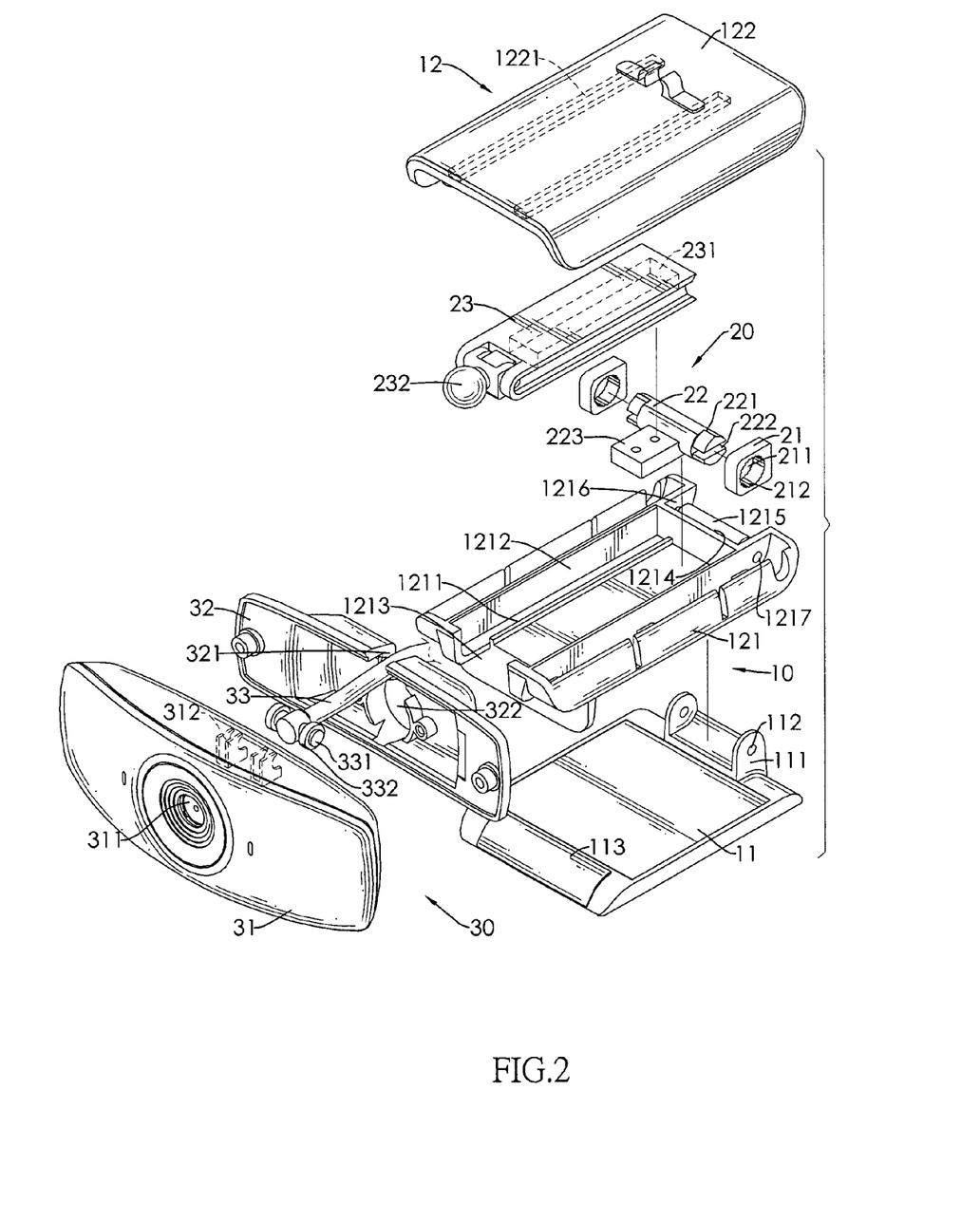
FIG. 2 is an exploded perspective view of the web camera in FIG. 1.
Figure 3:
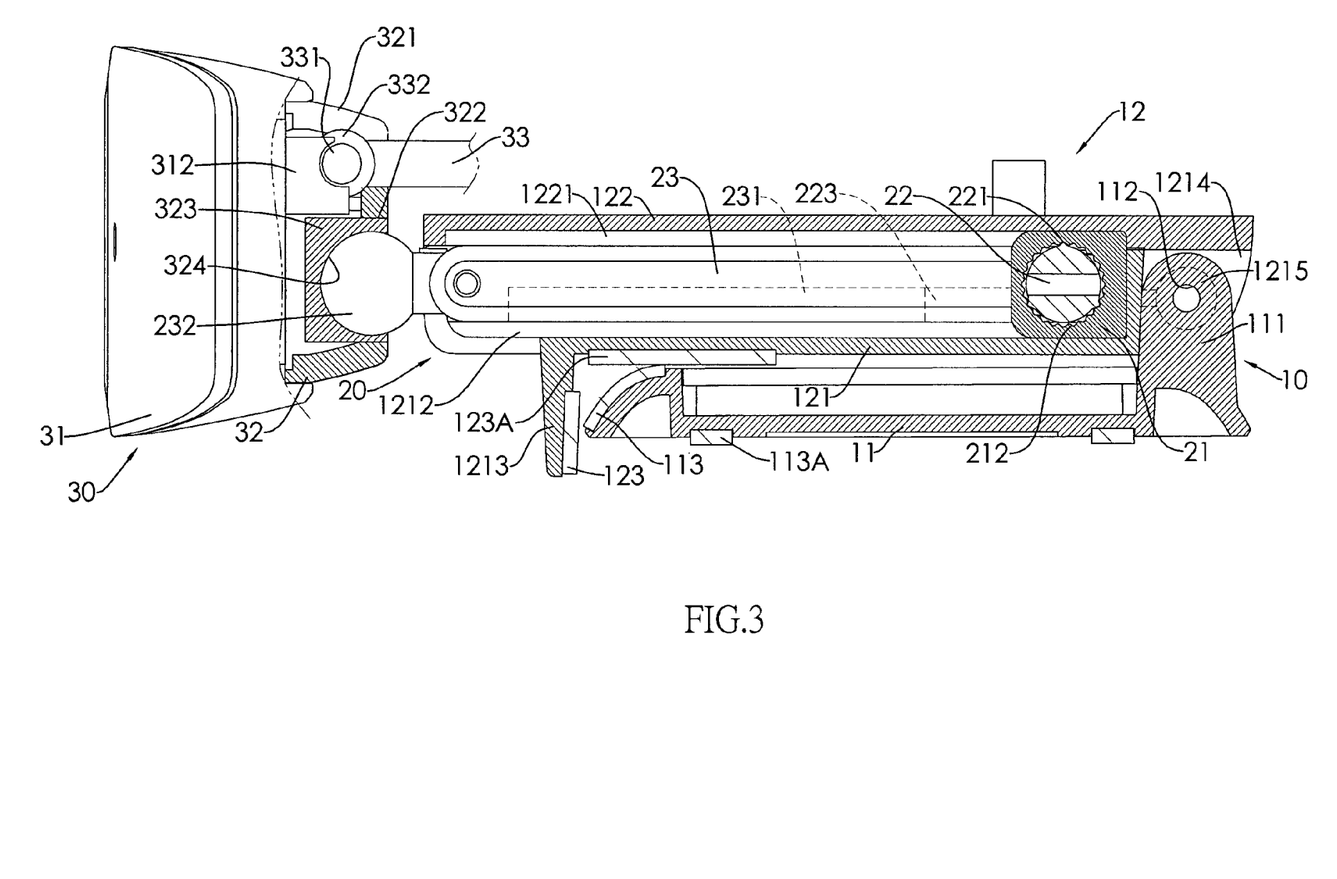
FIG. 3 is a side view in partial section of the web camera in FIG. 1.

With reference to FIGS. 1 to 3, a web camera with position adjustment function in accordance with the present invention comprises a clamping apparatus 10, a sliding assembly 20 and a camera module 30.

The clamping apparatus 10 includes a base 11 and a supporting bracket 12. The base 11 has a front edge, a rear edge, a lower surface, two pivoting segments 111, two pivoting holes 112 and multiple skidproof pads 113,113A. The pivoting segments 111 are respectively formed on and protrude from the rear edge of the base 11. The pivoting holes 112 are respectively formed through the pivoting segments 111. The skidproof pads 113,113A are respectively attached to the front edge and the lower surface of the base 11.

Figure 4:
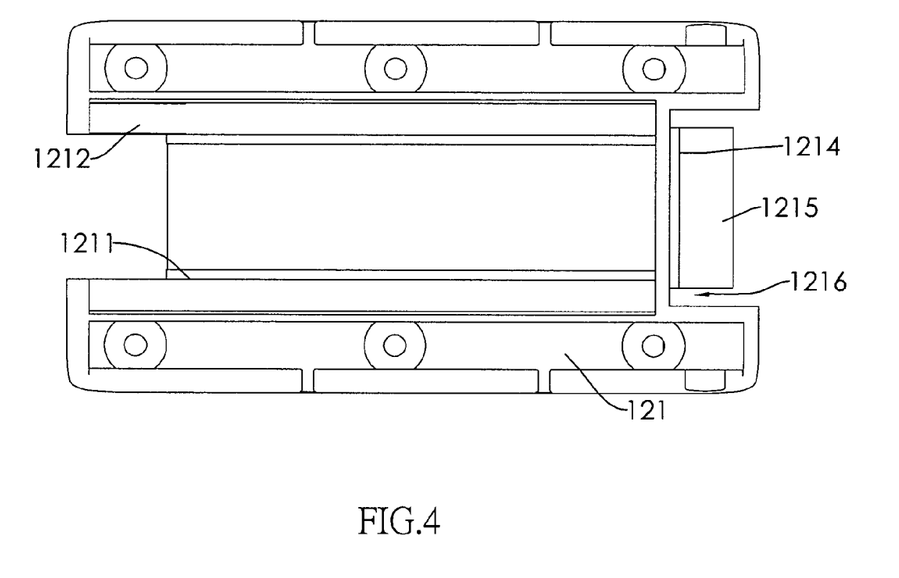
FIG. 4 is a top view of a bottom cover of a supporting bracket of a clamping apparatus of the web camera in FIG. 1.

The supporting bracket 12 is connected pivotally to the rear edge of the base 11 and has a bottom cover 121, a top cover 122 and multiple skidproof pads 123,123A. With further reference to FIG. 4, the bottom cover 121 has an upper surface, a lower surface, a front edge, a rear edge, two sides, two protrusions 1211, two sliding channels 1212, a barrier board 1213, a pivoting recess 1214, a pivoting rod 1215, two grooves 1216 and two pivoting holes 1217. The protrusions 1211 are separately formed on and protrude from the upper surface of the bottom cover 121 and are disposed parallel to the sides of the bottom cover 121. The sliding channels 1212 are respectively formed on the upper surface of the bottom cover 121, are positioned respectively at two sides of the protrusions 1211 and are disposed parallel to the sides of the bottom cover 121. The barrier board 1213 protrudes from the lower surface of the bottom cover 121 near the front edge of the bottom cover 121 and has a rear surface. The pivoting recess 1214 is formed in the rear edge of the bottom cover 121 and has a recess edge surface and two opposite recess sidewalls. The pivoting rod 1215 is disposed inside the pivoting recess 1214 and is mounted securely on the recess edge surface of the pivoting recess 1214. The pivoting rod 1215 has two opposite end surfaces respectively facing the recess sidewalls of the pivoting recess 1214. The grooves 1216 are respectively defined between the end surfaces of the pivoting rod 1215 and the recess sidewalls of the pivoting recess 1214 for receiving the pivoting segments 111 of the base 11. The pivoting holes 1217 are respectively formed through the recess sidewalls of the pivoting recess 1214 and respectively align with the pivoting holes 112 of the base 11. Two pins are respectively mounted through two groups of the aligned pivoting holes 1217, 112 of the bottom cover 121 of the supporting bracket 12 and of the base 11 to connect the supporting bracket 12 and the base 11 pivotally. The skidproof pads 123,123A are respectively attached to the rear surface of the barrier board 1213 of the bottom cover 121 and the lower surface of the bottom cover 121. The top cover 122 corresponds to and covers the bottom cover 121 so as to form a chamber between the bottom cover 121 and the top cover 122. The chamber has an open front. The top cover 122 has two sliding channels 1221 respectively formed in a lower surface of the top cover 122 and corresponding to the sliding channels 1212 of the bottom cover 121.

Figure 5:
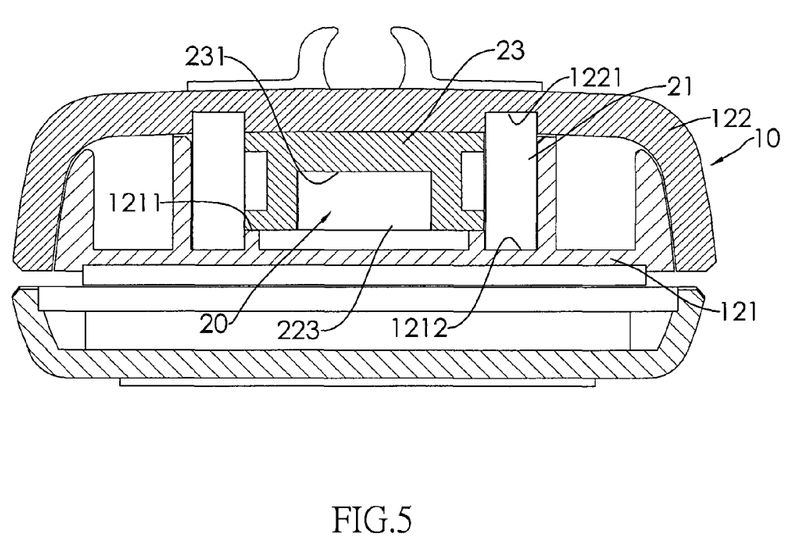
FIG. 5 is an enlarged cross-sectional front view of the web camera in FIG. 1.

The sliding assembly 20 is disposed inside the chamber of the supporting bracket 12 and includes two sliding blocks 21, a positioning rod 22 and an extending arm 23. With further reference to FIG. 5, the sliding blocks 21 are respectively and slidably mounted between the sliding channels 1212 of the bottom cover 121 and the sliding channels 1221 of the top cover 122. Each sliding block 21 has an internal gear 211 having teeth 212.

The positioning rod 22 is rotatably connected between the sliding blocks 21 and has two end portions, a middle portion and a connecting panel 223. Each end portion of the positioning rod 22 is mounted in a corresponding internal gear 211 of the sliding blocks 21 and has an annular surface, an end surface, at least one tooth 221 and a slot 222. Each one of the at least one tooth 221 is formed on and protrudes from the annular surface of the end portion of the positioning rod 22 and selectively engages the teeth 212 of the internal gear 211 of the corresponding sliding block 21. The slot 222 is formed in the end surface of the end portion of the positioning rod 22. The connecting panel 223 is formed on and protrudes forward from the middle portion of the positioning rod 22.

The extending arm 23 is mounted movably in the chamber of the supporting bracket 12, is positioned on the protrusions 1211 of the bottom cover 121 of the supporting bracket 12 and has a front end, a rear end, a lower surface, a connecting recess 231 and a ball 232. The rear end of the extending arm 23 is pivotally and slidably connected to the supporting bracket 12. The connecting recess 231 is formed in the lower surface of the extending arm 23 and has a rear opening to allow the connecting panel 223 of the positioning rod 22 to be mounted securely in the connecting recess 231. The ball 232 is wear resistant and is pivotally connected to the front end of the extending arm 23.

The camera module 30 is connected pivotally to the ball 232 of the extending arm 23 and includes a front housing 31, a rear housing 32 and a power cord 33. The front housing 31 has a rear surface, a rear opening, a camera lens 311 and two wire racks 312. The camera lens 311 is mounted securely on the front housing 31. The wire racks 312 are respectively formed on and protrude from the rear surface of the front housing 31.

The rear housing 32 corresponds to and covers the rear opening of the front housing 31 and has a top edge, a notch 321, a mounting hole 322, a ball holder 323 (with reference to FIG. 3). The notch 321 is formed in the top edge of the rear housing 31. The mounting hole 322 is formed through the rear housing 31 under the notch 321. The ball holder 323 is mounted securely in the mounting hole 322 and has a rear surface and a socket 324. The socket 324 is formed in the rear surface of the ball holder 323 and a shape of the socket 324 corresponds to a shape of the ball 232 of the extending arm 23. The ball 232 of the extending arm 23 is received in the socket 324 of the ball holder 323 and is rotatable relative to the ball holder 323 so that the camera module 30 can be adjusted to a suitable orientation.

The power cord 33 passes through the notch 321 of the rear housing 32 and has a front portion and a rear portion. The front portion of the power cord 33 is disposed between the front housing 31 and the rear housing 32 and has two opposite sides and two columns 331. The columns 331 respectively protrude from the sides of the front portion of the power cord 33, are respectively mounted rotatably across the wire racks 312 of the front housing 31 and each column 331 has a annular sidewall, a middle portion and a flange 332. The flange 332 is formed around and protrudes radially from the annular sidewall and the middle portion of the column 331. The rear portion of the power cord 33 protrudes rearward out of the rear housing 32.

Figure 6:
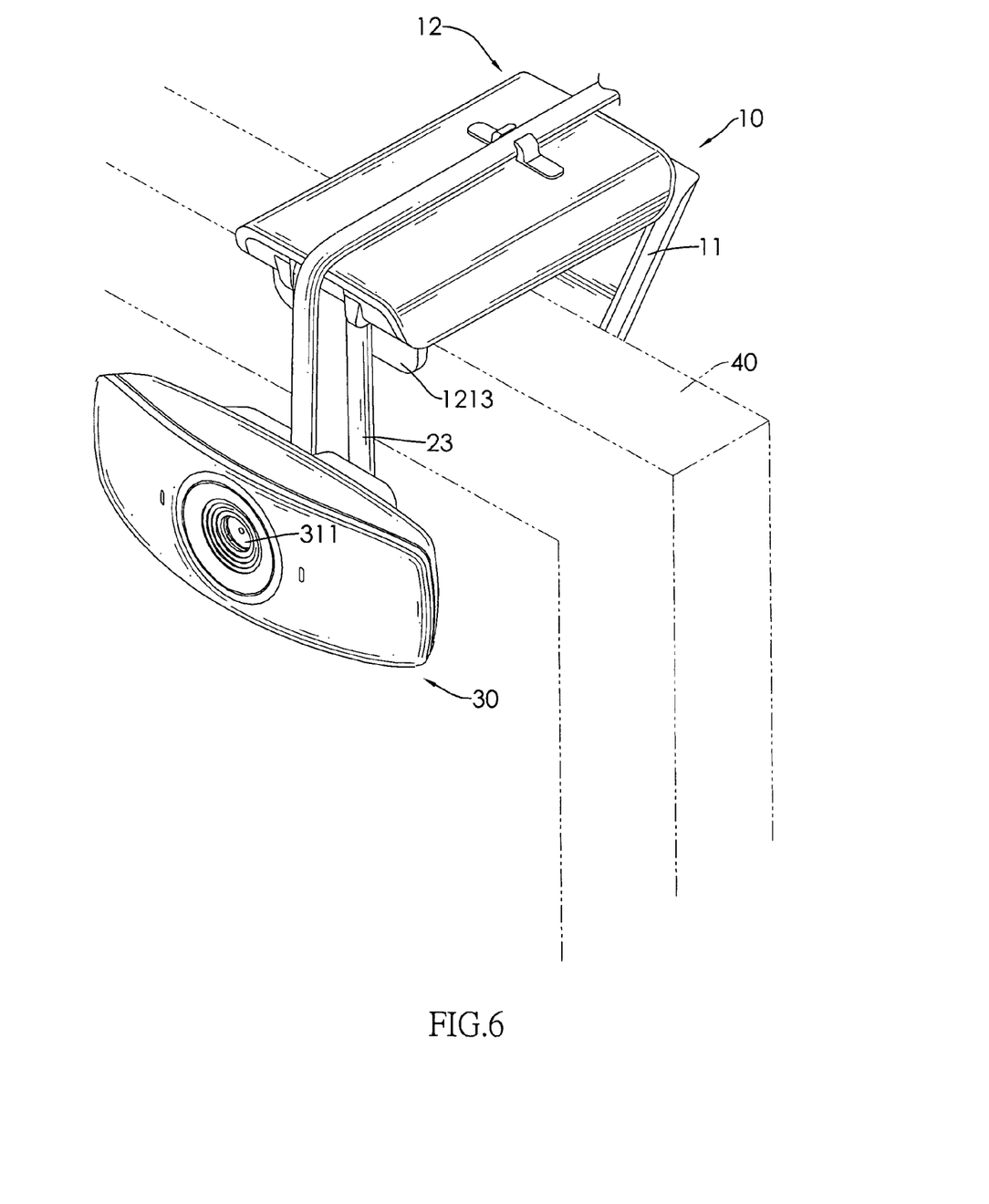
FIG. 6 is an operational perspective view of the web camera in FIG. 1 showing that the web camera clamps a computer screen.
Figure 7:
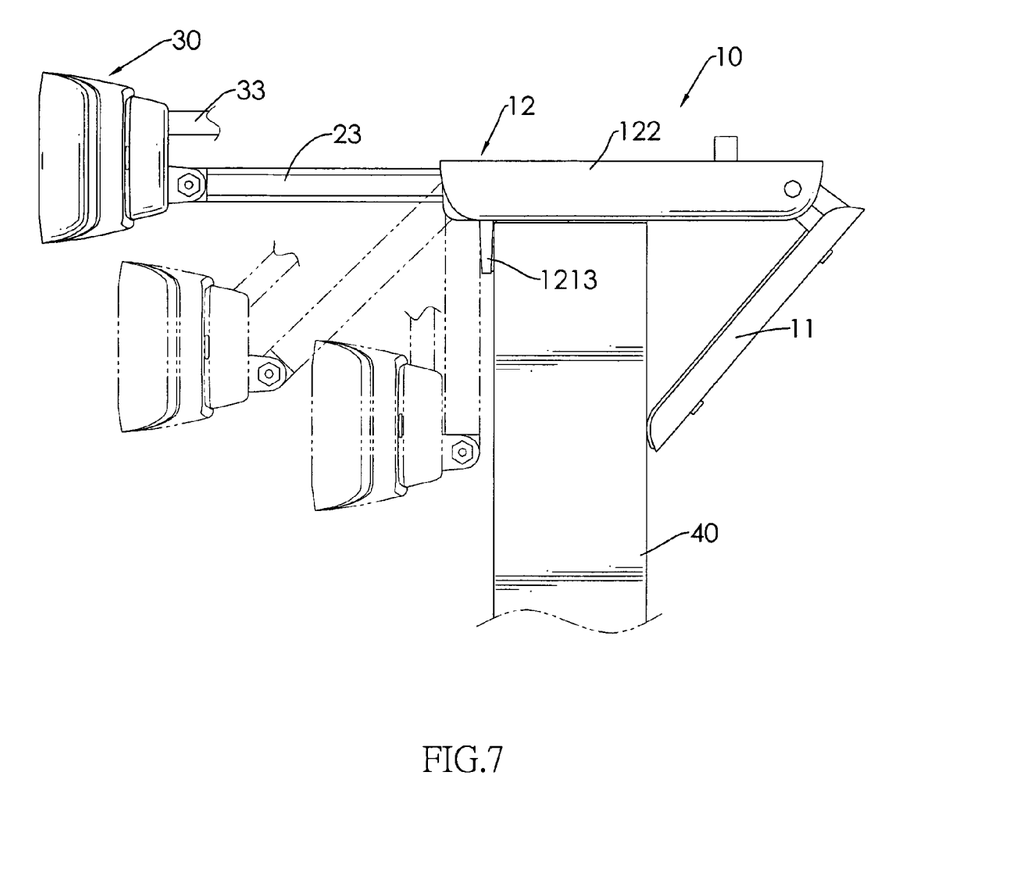
FIG. 7 is an operational side view of the web camera in FIG. 1 showing that the web camera clamps the computer screen.
Figure 9:
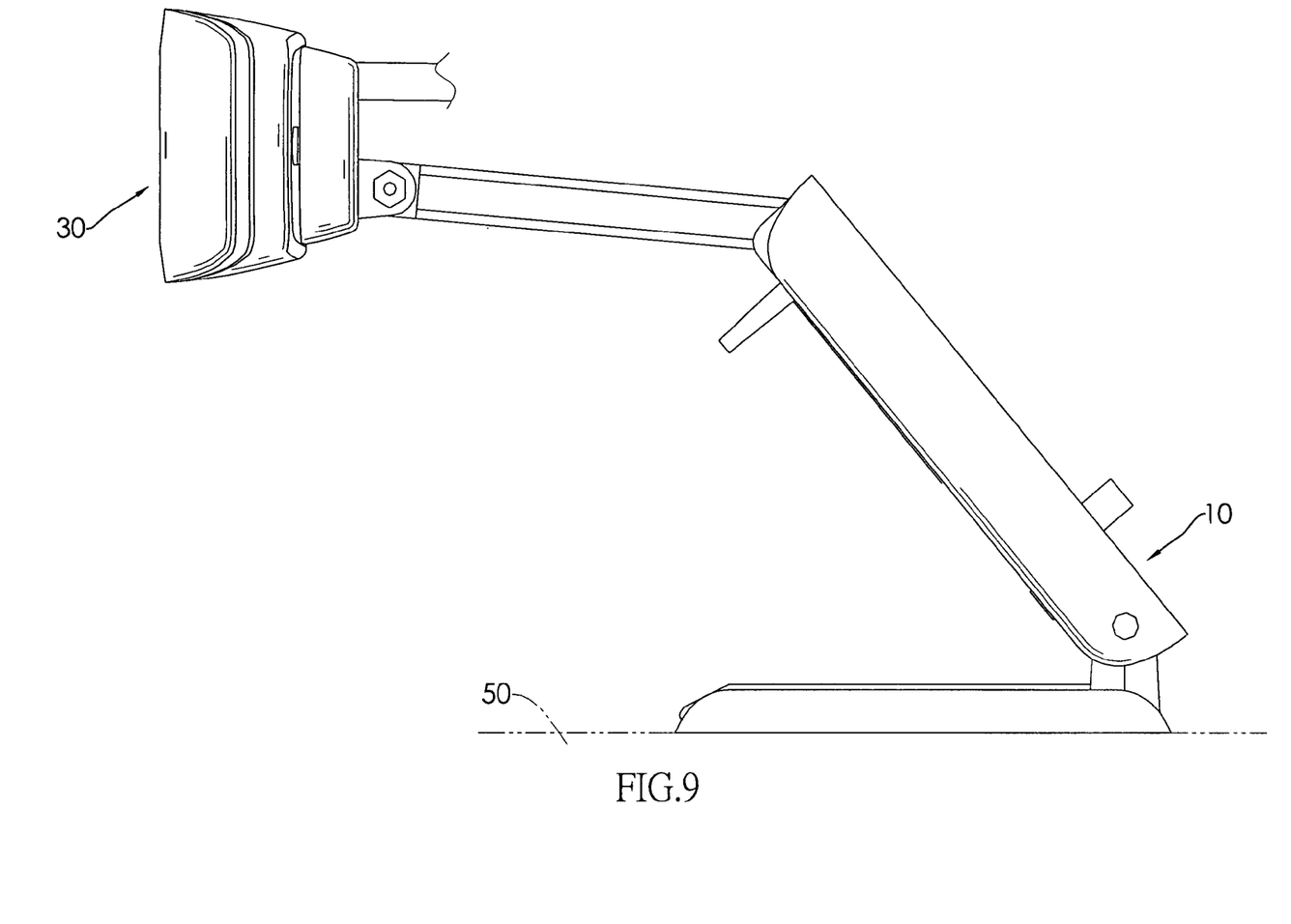
FIG. 9 is an operational side view of the web camera in FIG. 1 showing that the web camera is placed on a desk.

With reference to FIGS. 6 and 7, when the web camera in accordance with the present invention is in use, the supporting bracket 12 is mounted over an upper surface of a computer screen 40, the barrier board 1213 of the bottom cover 121 of the supporting bracket 12 abuts a front surface of the computer screen 40 and the front edge of the base 11 abuts a rear surface of the computer screen 40 to make the clamping apparatus 10 clamp securely an upper edge of the computer screen 40. The base 11 being rotatable relative to the supporting bracket 12 enables the clamping apparatus 10 to clamp computer screens with different thicknesses. With reference to FIG. 9, the clamping apparatus 10 can also be placed on a desk 50 by putting the base 11 on the desk 50 directly.

Figure 8:
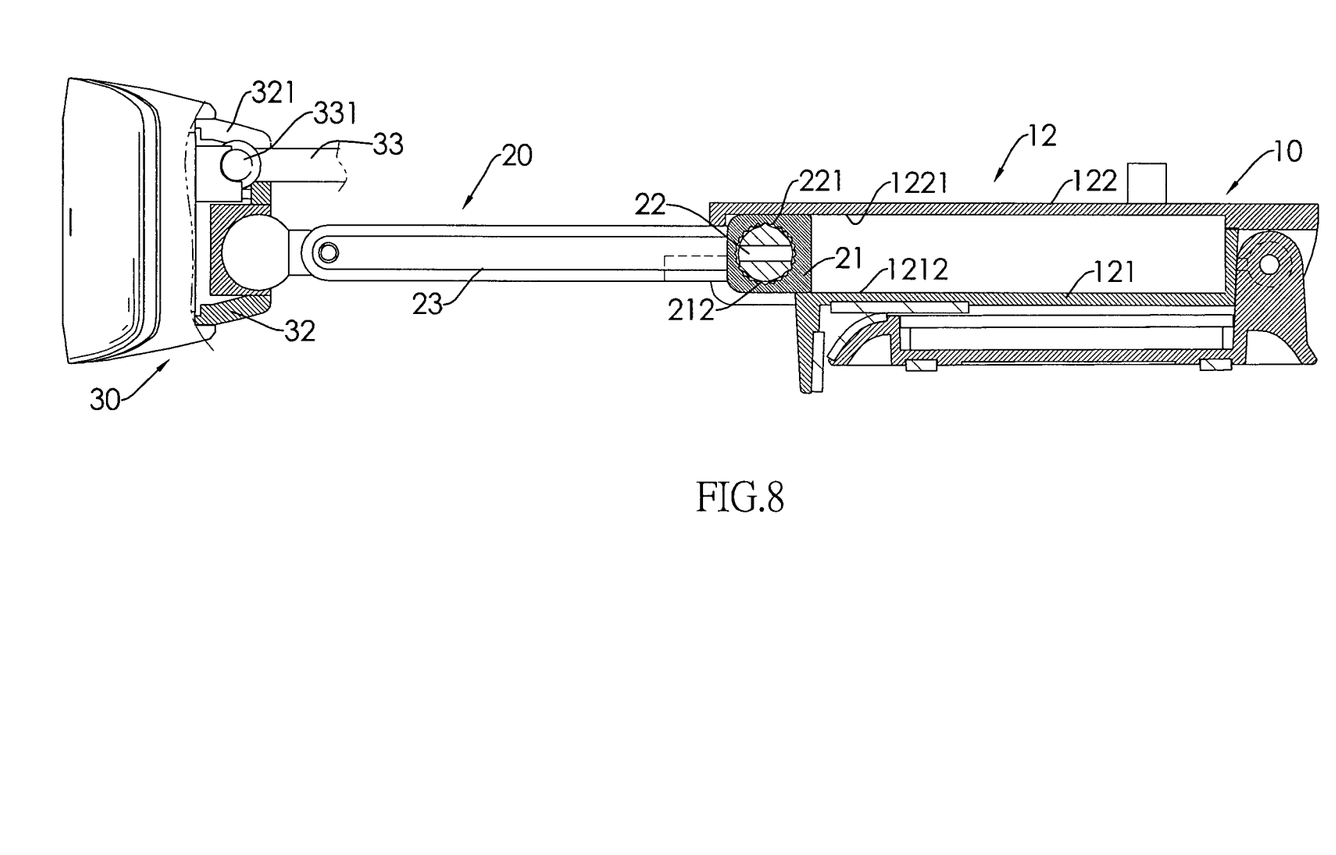
FIG. 8 is an operational side view in partial section of the web camera in FIG. 1 showing that an extending arm protrudes out of the supporting bracket.

When the extending arm 23 is disposed inside the chamber of the supporting bracket 12, a horizontal position of the camera module 30 of the web camera clamping the upper edge of the computer screen 40 is higher than a user's face and images shot by the web camera can only show the user's face in top views. With reference to FIGS. 7 and 8, the user can get images showing the user's face in eye level views by pulling the extending arm 23 out of the open front of the supporting bracket 12 to drive the sliding blocks 21 to slide forward along the sliding channels 1212 of the bottom cover 121 and the sliding channels 1221 of the top cover 122. When the sliding blocks 21 slide to abut front surfaces of the sliding channels 1212, 1221 of the bottom cover 121 and the top cover 122, the positioning rod 22 can be rotated relative to the sliding blocks 21 so the extending arm 23 secured to positioning rod 22 then can be rotated downward relative to the supporting bracket 12 to adjust the horizontal position of the camera module 30. After the horizontal position of the camera module 30 has been adjusted, the camera module 30 can be rotated relative to the extending arm 23 to adjust to a suitable orientation. Thus, the user can adjust the camera module 30 to be located at the user's eye level and images taken by the camera can show the user's face in eye level views.

Besides, the extending arm 23 can be selectively held and positioned by the teeth 221 of the positioning rods 22 engaging the teeth 212 of the sliding blocks 21. In a preferred embodiment, each sliding block 21 has twenty-four teeth 212 and each end portion of the positioning rod 22 has three teeth 221. Under this embodiment, the extending arm 23 can be positioned at each fifteen degrees relative to the sliding blocks 21 and a maximum angle between the extending arm 23 and the supporting bracket 12 can be adjusted to ninety degrees.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A web camera comprising:
   a clamping apparatus including
   a base having a rear edge; and
   a supporting bracket connected pivotally to the rear edge of the base and having
   a bottom cover having
   an upper surface;
   two protrusions separately formed on and protruding from the upper surface of the bottom cover; and
   two sliding channels respectively formed on the upper surface of the bottom cover and positioned respectively at two sides of the protrusions; an
   a top cover corresponding to and covering the bottom cover so as to form a chamber between the bottom cover and the top cover, and the chamber having an open front:
   a sliding assembly disposed inside the chamber of the supporting bracket of the clamping apparatus and including
   two sliding blocks respectively and slidably mounted in the sliding channels of the bottom cover of the supporting bracket of the clamping apparatus;
   a positioning rod rotatably connected between the sliding blocks; and
   an extending arm mounted movably in the chamber of the supporting bracket of the clamping apparatus, positioned on the protrusions of the bottom cover of the supporting bracket, secured to the positioning rod and having
   a front end protruding out of the open front of the supporting bracket of the clamping apparatus; and
   a rear end pivotally and slidably connected to the supporting bracket of the clamping apparatus; and
   a camera module connected pivotally to the front end of the extending arm of the sliding assembly.

2. The web camera as claimed in claim 1, wherein each sliding block of the sliding assembly has an internal gear having teeth; and
   the positioning rod of the sliding assembly has two end portions and each end portion mounted in a corresponding internal gear of the sliding blocks and having
   an annular surface; and
   at least one tooth formed on and protruding from the annular surface of the end portion of the positioning rod and selectively engaging the teeth of the internal gear of the corresponding sliding block.

3. The web camera as claimed in claim 2, wherein each sliding block has twenty-four teeth and each end portion of the positioning rod has three teeth.

4. The web camera as claimed in claim 1, wherein
   the extending arm of the sliding assembly further has a ball pivotally connected to the front end of the extending arm; and
   the camera module includes
   a front housing having a rear opening and a camera lens;
   a rear housing corresponding to and covering the rear opening of the front housing and having
   a mounting hole formed through the rear housing; and
   a ball holder mounted securely in the mounting hole and having
   a rear surface; and
   a socket formed in the rear surface of the ball holder, a shape of the socket corresponding to a shape of the ball of the extending arm and the ball of the extending arm received in the socket and rotatable relative to the ball holder; and
   a power cord.

5. The web camera as claimed in claim 4, wherein
   the front housing of the camera module further has a rear surface and two wire racks respectively formed on and protruding from the rear surface of the front housing;
   the rear housing of the camera module further has a top edge and a notch formed in the top edge of the rear housing; and
   the power cord of the camera module passes through the notch of the rear housing and has a front portion disposed between the front housing and the rear housing and having two opposite sides; and
   two columns respectively protruding from the sides of the front portion of the power cord and respectively mounted across the wire racks of the front housing; and
   a rear portion protruding rearward out of the rear housing.

6. The web camera as claimed in claim 1, wherein
   the base of the clamping apparatus further has
   two pivoting segments respectively formed on and protruding from the rear edge of the base; and
   two pivoting holes respectively formed through the pivoting segments; and
   the supporting bracket of the clamping apparatus further has
   a rear edge;
   a pivoting recess formed in the rear edge of the supporting bracket and having a recess edge surface and two opposite recess sidewalls;
   a pivoting rod disposed inside the pivoting recess, mounted securely on the recess edge surface of the pivoting recess and having two opposite end surfaces respectively facing the recess sidewalls of the pivoting recess;
   two grooves respectively defined between the end surfaces of the pivoting rod and the recess sidewalls of the pivoting recess for receiving the pivoting segments of the base; and
   two pivoting holes respectively formed through the recess sidewalls of the pivoting recess and respectively aligning with the pivoting holes of the base, two pins respectively mounted through two groups of the aligned pivoting holes of the supporting bracket and of the base.

7. A web camera comprising:
   a clamping apparatus including
   a base having a rear edge; and
   a supporting bracket connected pivotally to the rear edge of the base and having a chamber;
   an extending arm mounted movably in the chamber of the supporting bracket of the clamping apparatus and having
   a front end; and
   a rear end coupled to a positioning rod and each of opposite ends of the positioning rod rotatably connected to a sliding block within the chamber of the supporting bracket, whereby the positioning rod and the sliding blocks are movable together with the extending arm within the chamber of the supporting bracket such that the extending arm can be extended out from the supporting bracket and pivoted to the sliding block; and
   a camera module connected pivotally to the front end of the extending arm.

8. The web camera as claimed in claim 7, wherein each end of the positioning rod has at least one tooth and each sliding block has an internal gear having teeth such that the tooth rotatably engages with the teeth of the internal gear.

* * * * *